US007634288B2

(12) United States Patent
Hakao (10) Patent No.: US 7,634,288 B2
(45) Date of Patent: Dec. 15, 2009

(54) MOBILE COMMUNICATION SYSTEM, MOBILE COMMUNICATION TERMINAL, POWER CONTROL METHOD USED THEREFOR, AND PROGRAM THEREFOR

(75) Inventor: Tomoaki Hakao, Tokyo (JP)

(73) Assignee: NEC Corporation (JP)

( * ) Notice: Subject to any disclaimer, the term of this patent is extended or adjusted under 35 U.S.C. 154(b) by 604 days.

(21) Appl. No.: 10/901,181

(22) Filed: Jul. 29, 2004

(65) Prior Publication Data
US 2005/0026641 A1   Feb. 3, 2005

(30) Foreign Application Priority Data
Jul. 30, 2003   (JP)   ............... 2003-282230

(51) Int. Cl.
*H04B 7/00* (2006.01)
*H04B 7/185* (2006.01)
(52) U.S. Cl. ........................... 455/522; 370/318
(58) Field of Classification Search ............... 455/522
See application file for complete search history.

(56) References Cited

U.S. PATENT DOCUMENTS

| 6,396,867 | B1 | 5/2002 | Tiedemann, Jr. et al. |
| 6,463,296 | B1 | 10/2002 | Esmailzadeh et al. |
| 2002/0082038 | A1* | 6/2002 | Mochizuki ............... 455/522 |
| 2004/0005906 | A1* | 1/2004 | Okumura et al. ............ 455/522 |
| 2004/0258024 | A1* | 12/2004 | Tiedemann et al. ......... 370/332 |
| 2007/0129096 | A1* | 6/2007 | Okumura et al. ............ 455/522 |

FOREIGN PATENT DOCUMENTS

| EP | 1 067 708 A1 | 1/2001 |
| JP | 2000-349704 | 12/2000 |
| JP | 2002-026747 | 1/2002 |
| JP | 2002-171221 | 6/2002 |
| JP | 2002-176367 | 6/2002 |
| JP | 2002-198899 | 7/2002 |
| JP | 2002-237777 | 8/2002 |
| JP | 2003-087184 | 3/2003 |
| JP | 2003-163630 | 6/2003 |
| WO | WO 01/41485 A1 | 6/2001 |
| WO | WO 01/95521 A2 | 12/2001 |

* cited by examiner

*Primary Examiner*—Matthew D Anderson
*Assistant Examiner*—Bobbak Safaipour
(74) *Attorney, Agent, or Firm*—Dickstein, Shapiro, LLP.

(57) ABSTRACT

This invention is directed to a mobile communication system in which the downlink transmission power of a base station is controlled in accordance with a power control bit from a mobile communication terminal, a mobile communication terminal, a power control method, and a program. According to the invention, in order to reliably perform power control even during soft handover communication with a plurality of cells, a determination unit is provided which determines whether the downlink transmission power of a base station complies with the power control bit transmitted from the mobile communication terminal.

16 Claims, 6 Drawing Sheets

MOBILE COMMUNICATION SYSTEM, MOBILE COMMUNICATION TERMINAL, POWER CONTROL METHOD USED THEREFOR, AND PROGRAM THEREFOR

BACKGROUND OF THE INVENTION

1. Field of the Invention

The present invention relates to a mobile communication system, a mobile communication terminal, and a power control method used therefor, and a program therefor and, more particularly, to a power control method in a CDMA (Code Division Multiple Access) mobile communication terminal.

2. Description of the Prior Art

Figure 1:
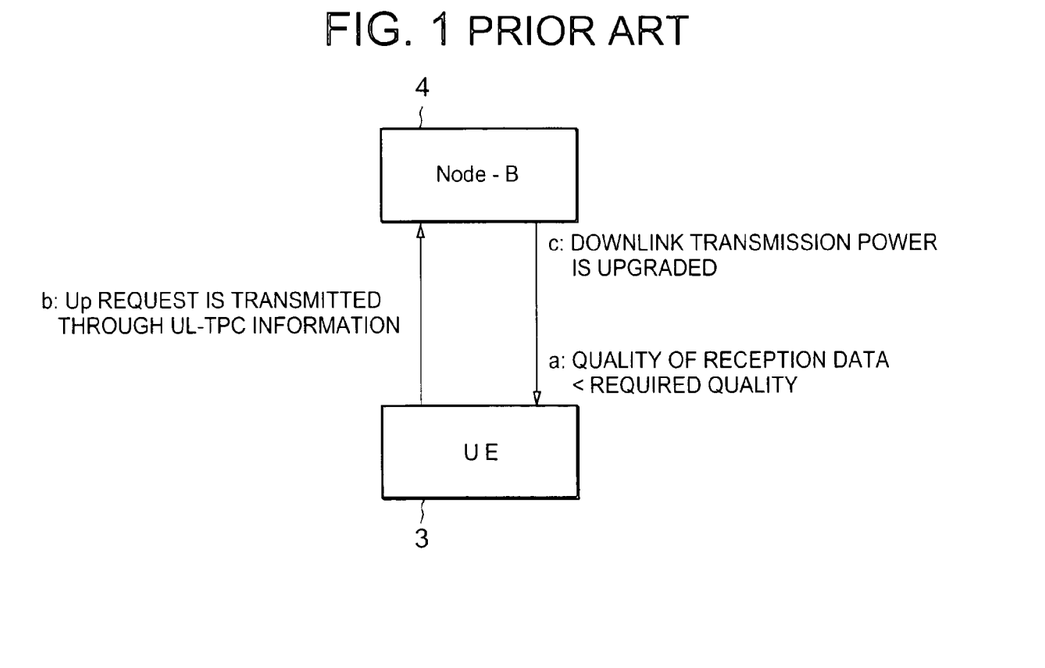
FIG. 1 is a view for explaining conventional downlink power control using UL-TPC information.
Figure 2:
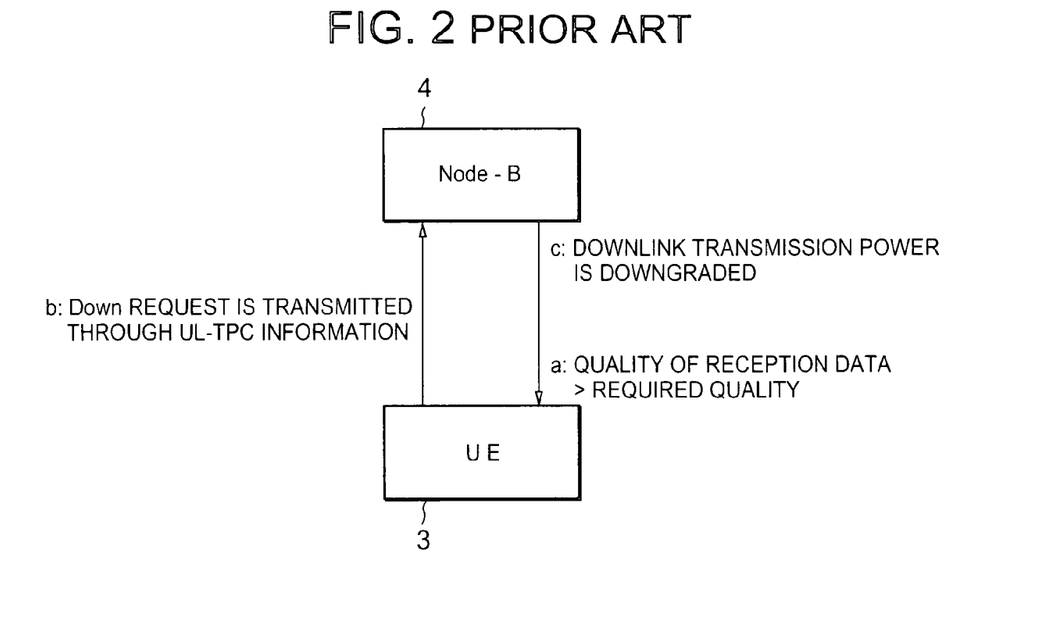
FIG. 2 is a view for explaining conventional downlink power control using UL-TPC information.

In a conventional CDMA mobile communication system, as shown in FIGS. 1 and 2, Up/Down/Hold of downlink transmission power from a base station (Node-B) 4 is controlled by a downlink transmission power control bit (UL-TPC (Up Link-Transmit Power Control) information) from a mobile communication terminal (UE: User Equipment) 3.

The mobile communication terminal 3 always checks whether the quality of downlink reception data satisfies the required quality defined for each service ("a" in FIGS. 1 and 2). If the quality satisfies the required quality, the mobile communication terminal 3 transmits Down information through UL-TPC information ("b" in FIG. 2). Otherwise, the mobile communication terminal 3 transmits Up information through UL-TPC information ("b" in FIG. 1).

The base station 4 receives UL-TPC information from the mobile communication terminal 3. If the UL-TPC information indicates "Up", the base station 4 upgrades the downlink transmission power ("c" in FIG. 1). If the UL-TPC information indicates "Down", the base station 4 downgrades the downlink transmission power ("c" in FIG. 2). The quality of downlink reception data in the mobile communication terminal 3 is maintained at the required quality by this feedback control.

In the above conventional mobile communication system, this technique is effective when a mobile communication terminal is communicating with one base station. When, however, a mobile communication terminal is performing soft handover communication with a plurality of base stations, i.e., a plurality of downlink wireless links are present, the following problems arise.

Figure 3:
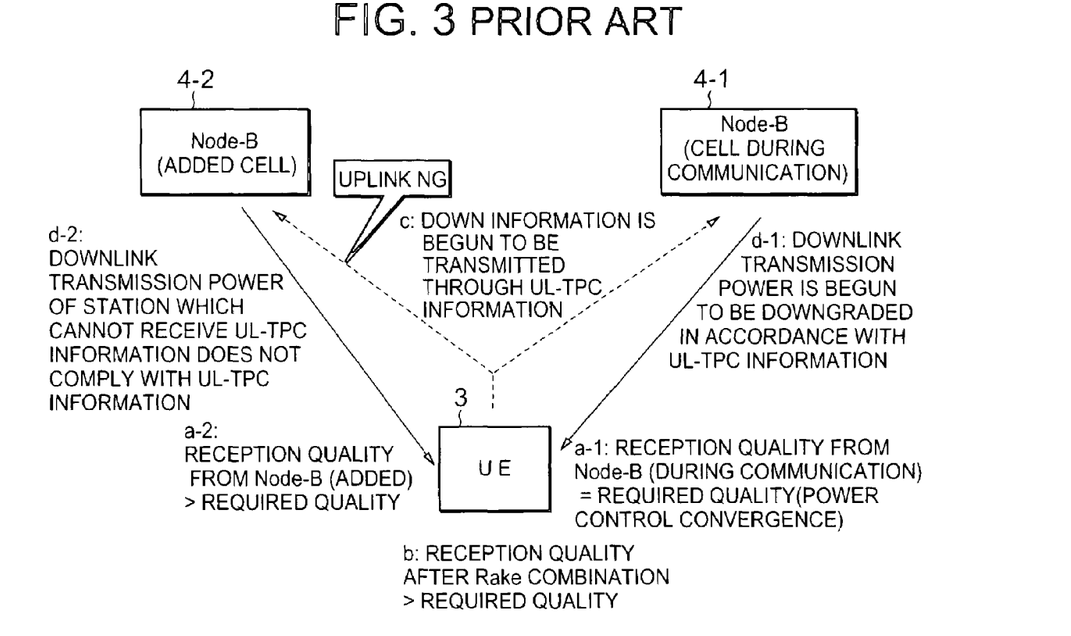
FIG. 3 is a view for explaining conventional downlink power control using UL-TPC information during soft handover.

Even if a plurality of downlink wireless links are present, only one uplink signal is transmitted from the mobile communication terminal, and there is only one piece of UL-TPC information. Assume that while the mobile communication terminal 3 is communicating with a base station 4-1 and power control is normally performed between the mobile communication terminal and the base station 4-1, a base station 4-2 is added (soft handover), as shown in FIG. 3. In this case, since no power control for downlink transmission power is performed between the base station 4-2 and the mobile communication terminal 3, the power of the mobile communication terminal 3 may be inappropriate for satisfying the required quality.

In addition, since uplink transmission power from the mobile communication terminal 3 is maintained to satisfy the required quality in the base station 4-1 by the same mechanism as described above (i.e., does not satisfy the required quality in the base station 4-2), the base station 4-2 may not properly receive UL-TPC information from the mobile communication terminal 3 immediately after the start of handover.

According to conventional downlink transmission power control, the mobile communication terminal 3 Rake-combines reception data from the base station 4-1 and reception data from the base station 4-2, and checks whether the combined reception data satisfies the required quality, thereby determining UL-TPC information.

As described above, the following phenomenon occurs under the situation where downlink transmission power of the base station 4-2 is too high when viewed from the mobile communication terminal 3 and the base station 4-2 cannot properly receive UL-TPC information from the mobile communication terminal 3.

The reception quality in the mobile communication terminal 3 after Rake combination is dominated by high transmission power from the base station 4-2, and hence greatly exceeds the required quality. The mobile communication terminal 3 therefore transmits Down information through UL-TPC information ("a-2", "b", and "c" in FIGS. 3 and 4).

Figure 4:
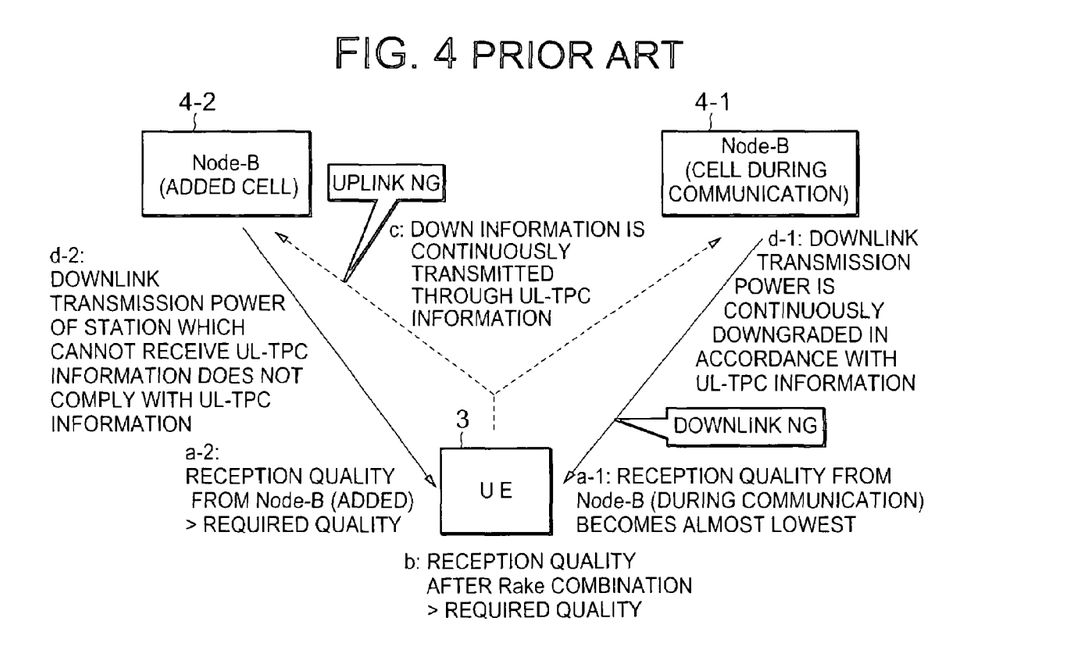
FIG. 4 is a view for explaining conventional downlink power control using UL-TPC information during soft handover.

However, the base station 4-2, which cannot properly receive UL-TPC information, continues transmission at high transmission power without complying with the Down information, and hence the mobile communication terminal 3 keeps transmitting Down information through UL-TPC information ("d-2" in FIGS. 3 and 4).

In contrast, since the base station 4-1 can properly receive UL-TPC information, the downlink transmission power of the base station 4-1 keeps downgrading owing to Down information through UL-TPC information continuously transmitted from the mobile communication terminal 3 ("a-1", "b", and "c" in FIGS. 3 and 4) and downgrades to a level at which the mobile communication terminal 3 cannot receive any information ("d-1" in FIG. 4).

Even in a handover state with respect to the base stations 4-1 and 4-2, downlink communication depends on only the base station 4-2 (reception data from the base station 4-1 cannot be received), and uplink communication depends on only the base station 4-1 (the base station 4-2 cannot receive any reception data from the mobile communication terminal 3).

In such a phenomenon, any Rake combination gain based on handover cannot be obtained. In addition, since the reception electric field of one base station (the reception electric field of a channel used for handover determination, which is different from a channel used for communication) deteriorates, when the link with the base station is disconnected (handover is canceled), uplink or downlink communication dependent on the base station is stopped. As a consequence, the communication itself is disconnected.

SUMMARY OF THE INVENTION

The present invention has been made in consideration of the above-described circumferences, and has as its object to provide a mobile communication system which can reliably perform power control even during soft handover communication with a plurality of cells, a mobile communication terminal, a power control method used therefor, and a program therefor.

In order to achieve the above object, according to the first aspect of the present invention, there is provided a mobile communication system which controls downlink transmission power of a base station in accordance with a power control bit from a mobile communication terminal, wherein the mobile communication terminal includes a determination unit which determines whether downlink transmission power of the base station complies with the power control bit transmitted from the mobile communication terminal.

According to the second aspect of the present invention, there is provided a mobile communication terminal which controls downlink transmission power of a base station by transmitting a power control bit, comprising a determination unit which determines whether or not downlink transmission power of the base station complies with a power control bit transmitted from the mobile communication terminal.

According to the third aspect of the present invention, there is provided a power control method for a mobile communication system which controls downlink transmission power of a base station in accordance with a power control bit from a mobile communication terminal, comprising, on the mobile communication terminal side, the step of determining whether downlink transmission power of the base station complies with the power control bit transmitted from the mobile communication terminal.

According to the fourth aspect of the present invention, there is provided a program for a power control method for a mobile communication system which controls downlink transmission power of a base station in accordance with a power control bit from a mobile communication terminal, the program causing a computer to execute a process of determining whether downlink transmission power of the base station complies with the power control bit transmitted from the mobile communication terminal.

As is obvious from the above aspects, the mobile communication system of the present invention proposes a method of controlling the downlink transmission power of a CDMA (Code Division Multiple Access) mobile communication terminal (UE: User Equipment) in order to improve the above problem.

According to the mobile communication system of the present invention, during handover communication with a plurality of base stations (Node-B), a mobile communication terminal checks whether the downlink transmission power of each of a plurality of base stations complies with the downlink transmission power control bit (UL-TPC (Up Link-Transmit Power Control) information) transmitted from the mobile communication terminal.

More specifically, the mobile communication system of the present invention compares, for example, UL-TPC (Up/Down/Hold) information of each of several samples transmitted from a mobile communication terminal in the past with a change (Up/Down/Hold) in reception level from each base station which is synchronous with the UL-TPC information. If the respective Up/Down/Hold patterns coincide with each other, it is determined that the corresponding base station has properly received the UL-TPC information. Otherwise, it is determined that the corresponding base station has not properly received the UL-TPC information.

In addition, the mobile communication system of the present invention ignores the quality of reception data from a base station which is determined not to have properly received the UL-TPC information transmitted from a mobile communication terminal, and performs downlink power control only in accordance with whether or not the quality of reception data of a base station which is determined to have properly received UL-TPC information satisfies the required quality defined for each service.

If, for example, there are a plurality of base stations determined to have properly receive UL-TPC information, the mobile communication terminal combines only reception data from the base stations, and checks whether the reception quality after combination satisfies the required quality defined for each service. If the reception quality satisfies the required quality, the mobile communication terminal transmits Down information through UL-TPC information. Otherwise, the mobile communication terminal transmits Up information through UL-TPC information.

As a mobile communication terminal moves and approaches a base station which has not properly received UL-TPC information, the UL-TPC information begins to properly reach the base station, and downlink transmission power is properly controlled. As the mobile communication terminal moves away from the base station, the link is disconnected (handover is canceled) upon reception electric field degradation.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENTS

An embodiment of a mobile communication system according to the present invention, and a few preferred of the present invention will be described below with reference to the accompanying drawings.

Figure 5:
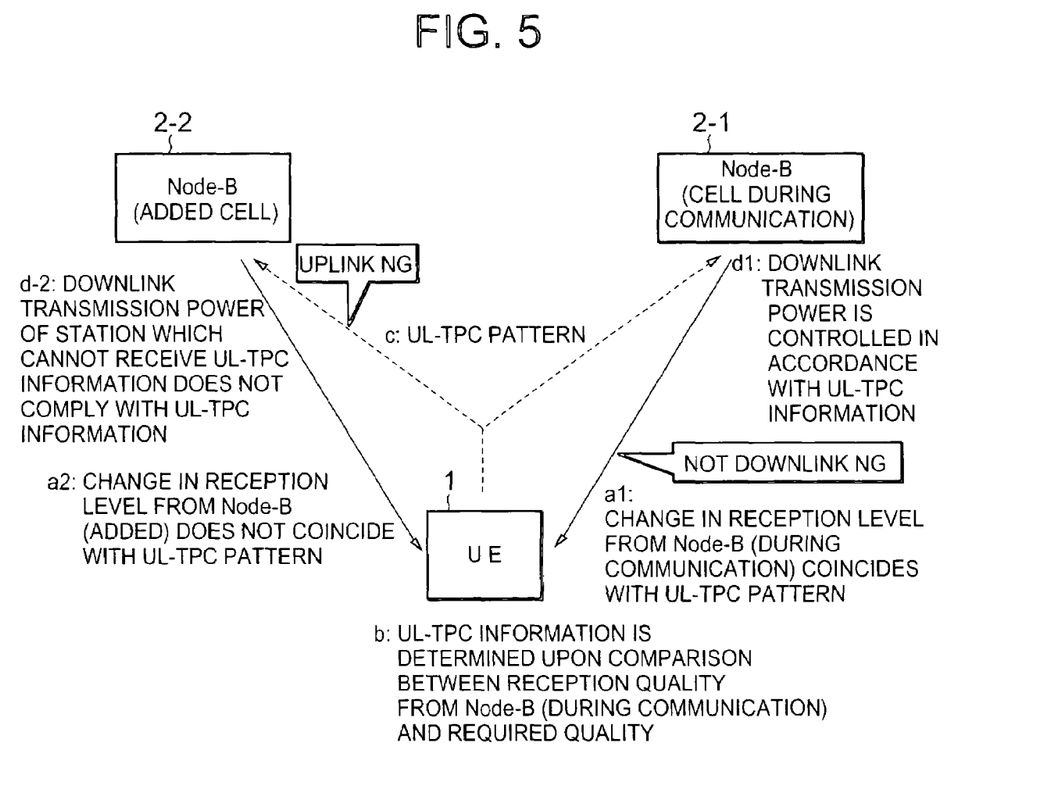
FIG. 5 is a view for explaining downlink power control using UL-TPC information during soft handover in a mobile communication system of the present invention.

FIG. 5 shows an embodiment of the mobile communication system according to the present invention, and more specifically is a view for explaining downlink power control by using UL-TPC information at the time of handover. Referring to FIG. 5, the mobile communication system of the present invention is comprised of a CDMA (Code Division Multiple Access) mobile communication terminal (UE: User Equipment) 1 and a plurality of base stations (Node-B) 2-1 and 2-2.

The wireless communication unit 1 checks whether downlink transmission power from each of the base stations 2-1 and 2-2 complies with the power control bit (UL-TPC (Up Link-Transmit Power Control) information) transmitted from the self-terminal.

More specifically, the wireless communication unit 1 compares each Up/Down/Hold pattern of past UL-TPC information transmitted from itself with a pattern of change in reception level (Up/Down/Hold) from each of the base stations 2-1 and 2-2 which is synchronous with the timing of each pattern. If these Up/Down/Hold patterns coincide with each other, the wireless communication unit 1 determines that each of the base stations 2-1 and 2-2 is controlling downlink transmission power in accordance with the UL-TPC information. If they do not coincide with each other, the wireless communication unit 1 determines that each of the base stations 2-1 and 2-2 is not controlling downlink transmission power in accordance with the UL-TPC information.

The wireless communication unit 1 also compares a past UL-TPC pattern (Up/Down/Hold) transmitted from itself with a change in reception level (each Up/Down/Hold pattern) from each of the base stations 2-1 and 2-2 which is synchronous with the timing of the UL-TPC pattern during handover communication with the base stations 2-1 and 2-2 ("a1" and "a2" in FIG. 5).

If the Up/Down/Hold patterns coincide with each other, the wireless communication unit 1 determines that the base station 2-1 is controlling downlink transmission power in accordance with the UL-TPC information ("a1" in FIG. 5). If they do not coincide with each other, the wireless communication unit 1 determines that the base station 2-2 is not controlling downlink transmission power in accordance with the UL-TPC information ("a2" in FIG. 5). In this case, the wireless communication unit 1 ignores the quality of reception data from a base station which is determined not to be controlling downlink transmission power.

Furthermore, the wireless communication unit 1 controls downlink transmission power in accordance with whether or not the quality of reception data from the base station 2-1 which is determined to be controlling downlink transmission power in accordance with the UL-TPC information transmitted from the self-terminal satisfies the required reception quality ("b", "c", and "d1" in FIG. 5).

If, for example, it is determined that a plurality of base stations are controlling downlink transmission power in accordance with the UL-TPC information, the wireless communication unit 1 combines only reception data from these base stations, and checks whether the reception quality after combination satisfies the required reception quality. If the reception quality satisfies the required reception quality, the wireless communication unit 1 transmits Down information through UL-TPC information. Otherwise, the wireless communication unit 1 transmits Up information through UL-TPC information.

First Embodiment

Figure 6:
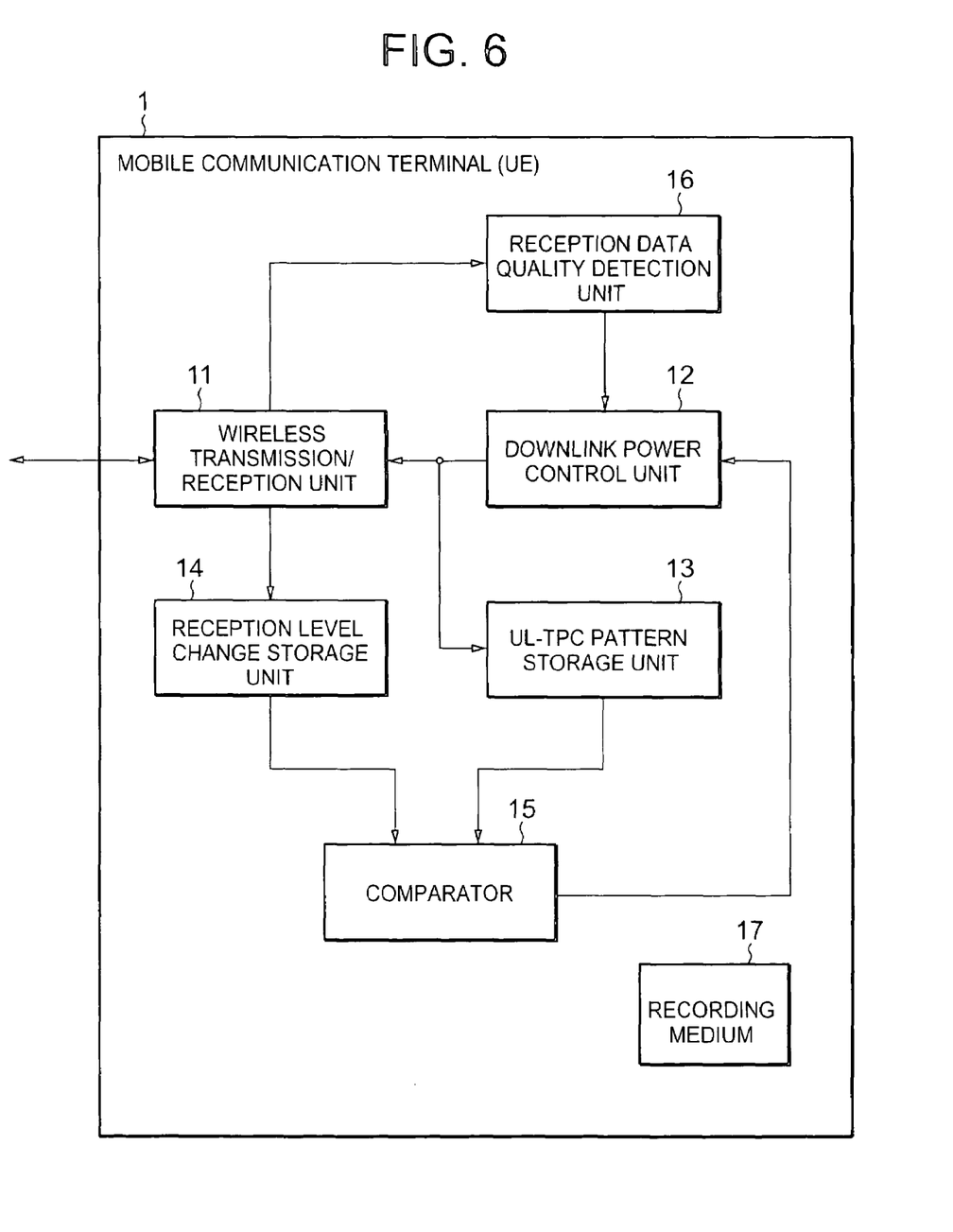
FIG. 6 is a block diagram showing the arrangement of a mobile communication terminal according to an embodiment of the present invention.

FIG. 6 is a block diagram showing the arrangement of a mobile communication terminal according to an embodiment of the present invention. Referring to FIG. 6, a mobile communication terminal 1 is comprised of a wireless transmission/reception unit 11, downlink power control unit 12, UL-TPC pattern storage unit 13, reception level change storage unit 14, comparator 15, reception data quality detection unit 16, and recording medium 17. Note that the mobile communication terminal 1 indicates the mobile communication terminal 1 of the mobile communication system according to the embodiment of the present invention shown in FIG. 5. A program (computer-executable program) for implementing each unit of the mobile communication terminal 1 is stored in the recording medium 17.

The wireless transmission/reception unit 11 transmits/receives data, control signals, and the like to/from base stations (not shown) by radio. The downlink power control unit 12 controls the downlink transmission power of a base station by generating an UL-TPC pattern (Up/Down/Hold) on the basis of the comparison result obtained by the comparator 15 and the quality detected by the reception data quality detection unit 16, and transmitting the pattern to the base station.

The UL-TPC pattern storage unit 13 stores the UL-TPC pattern (Up/Down/Hold). The reception level change storage unit 14 stores a change in reception level (each Up/Down/Hold pattern) from each base station which is synchronous with the transmission timing of an UL-TPC pattern (Up/Down/Hold) from the downlink power control unit 12.

The comparator 15 compares the UL-TPC pattern (Up/Down/Hold) stored in the UL-TPC pattern storage unit 13 with the change in reception level (Up/Down/Hold) stored in the reception level change storage unit 14, and sends information indicating coincidence/incoincidence between them to the downlink power control unit 12. The reception data quality detection unit 16 detects the quality of the reception data received by the wireless transmission/reception unit 11, and sends the quality information to the downlink power control unit 12.

Although not shown, speech processing, image processing, calculation processing, and the like in the mobile communication terminal 1 are known, and hence descriptions of its arrangement and operation will be omitted.

Figure 7:
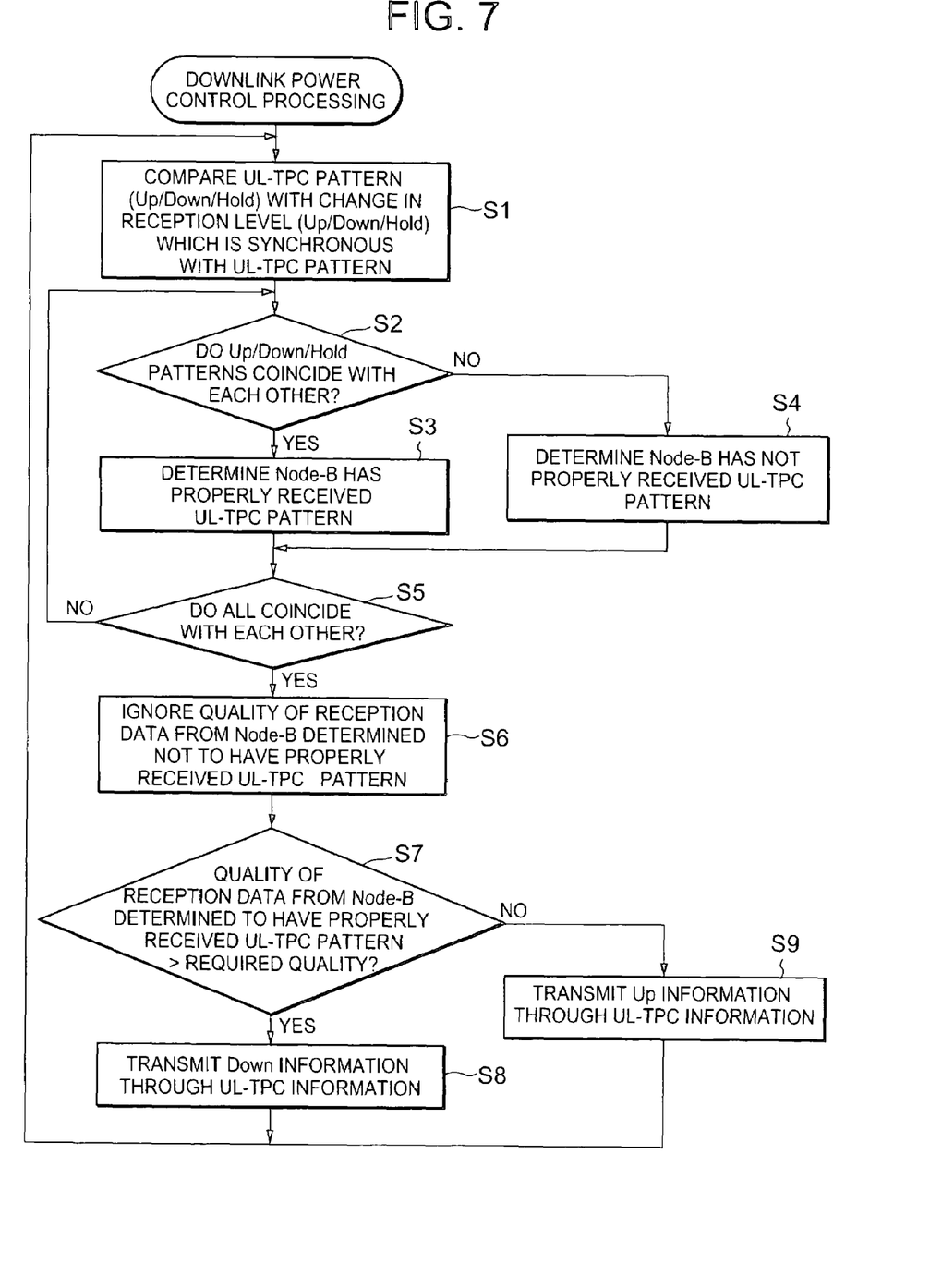
FIG. 7 is a flowchart showing the operation of a mobile communication terminal according to an embodiment of the present invention.

FIG. 7 is a flowchart showing the operation of the mobile communication terminal according to an embodiment of the present invention. The operation of the mobile communication terminal according to an embodiment of the present invention will be described below with reference to FIGS. 5 to 7. Note that the processing shown in FIG. 7 is implemented by causing a computer forming the mobile communication terminal 1 to execute a program in the recording medium 17.

During handover communication with a plurality of base stations 2-1 and 2-2, the mobile communication terminal 1 checks whether the downlink transmission power of each of the base stations 2-1 and 2-2 complies with the downlink transmission power control bit (UL-TPC information) transmitted from the self-terminal.

More specifically, the mobile communication terminal 1 compares, for example, each of pieces of UL-TPC information (each Up/Down/Hold pattern) (each UL-TPC pattern stored in the UL-TPC pattern storage unit 13) of past several samples transmitted from the self-terminal with each change in reception level (each Up/Down/Hold pattern) (each reception level change pattern stored in the reception level change storage unit 14) from each of the base stations 2-1 and 2-2 which is synchronous with the timing of the UL-TPC information (step S1 in FIG. 7).

If the respective Up/Down/Hold patterns stored in the UL-TPC pattern storage unit 13 and reception level change storage unit 14 coincide with each other (step S2 in FIG. 7), the mobile communication terminal 1 determines that each of the base stations 2-1 and 2-2 has properly received the UL-TPC information (step S3 in FIG. 7). If they do not coincide with each other (step S2 in FIG. 7), the mobile communication terminal 1 determines that each base station has not properly received the UL-TPC information (step S4 in FIG. 7).

The mobile communication terminal 1 compares all the Up/Down/Hold patterns stored in the UL-TPC pattern storage unit 13 and reception level change storage unit 14 (step S5 in FIG. 7). The mobile communication terminal 1 ignores the quality of reception data from a base station which is determined not to have properly received UL-TPC information (step S6 in FIG. 7), and performs downlink power control in accordance with whether the quality of reception data from only a base station determined to have properly received UL-TPC information (steps S7 to S9 in FIG. 7).

That is, the mobile communication terminal 1 checks whether the reception quality of reception data from a base station satisfies the required reception quality (step S7 in FIG. 7), transmits Down information through UL-TPC information if it satisfies the required reception quality (step S8 in FIG. 7), and transmits Up information through UL-TPC information if it does not satisfy the required reception quality (step S9 in FIG. 7).

As the mobile communication terminal 1 moves and approaches the base station 2-2 which has not properly received UL-TPC information, the UL-TPC information begins to properly reach the base station, and downlink transmission power is properly controlled. As the mobile communication terminal 1 moves away from the base station, the link is disconnected (handover is canceled) upon reception electric field degradation.

As described above, in this embodiment, the mobile communication terminal 1 can reliably perform power control even during soft handover communication with a plurality of cells. In this embodiment, downlink power control is properly performed with respect to a base station which has properly received UL-TPC information from the mobile communication terminal 1. This makes it possible to prevent an unstable state in which uplink communication depends on only one base station, and downlink communication depends on only the other base station, thereby preventing call disconnection.

Second Embodiment

Figure 8:
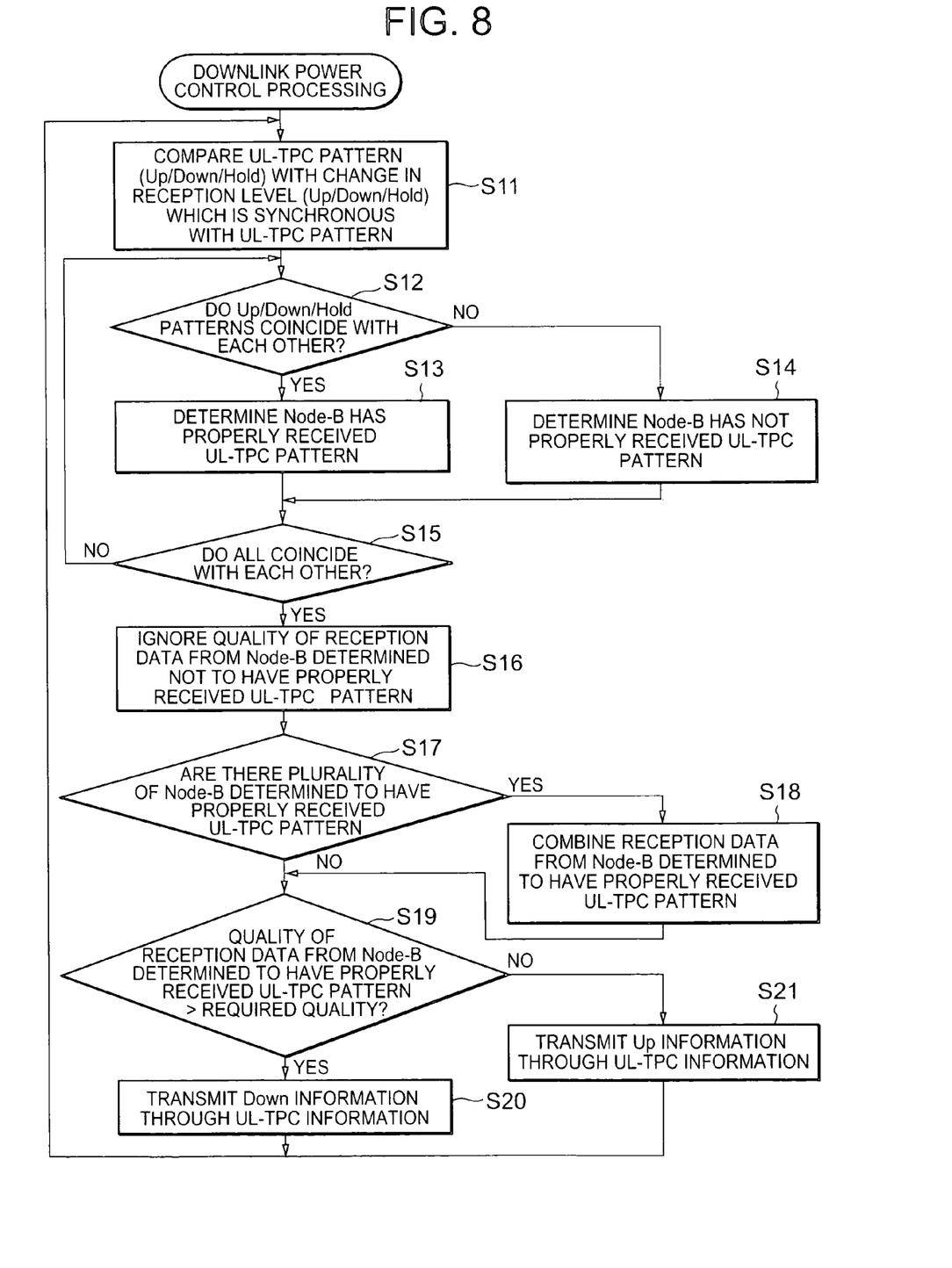
FIG. 8 is a flowchart showing the operation of a mobile communication terminal according to another embodiment of the present invention.

FIG. 8 is a flowchart showing the operation of a mobile communication terminal according to another embodiment of the present invention. Another embodiment of the present invention has the system arrangement shown in FIG. 5, and a mobile communication terminal used in this arrangement has the arrangement shown in FIG. 6. The operation of the mobile transmission terminal of this embodiment will be described with reference to FIGS. 5, 6 and 8. Note that the processing shown in FIG. 8 can be implemented by causing a computer forming a mobile communication terminal 1 execute a program in a recording medium 17.

During handover communication with a plurality of base stations 2-1 and 2-2, the mobile communication terminal 1 checks whether the downlink transmission power of each of the base stations 2-1 and 2-2 complies with the downlink transmission power control bit (UL-TPC information) transmitted from the self-terminal.

More specifically, the mobile communication terminal 1 compares, for example, each of pieces of UL-TPC information (each Up/Down/Hold pattern) (each UL-TPC pattern stored in an UL-TPC pattern storage unit 13) of past several samples transmitted from the self-terminal with each change in reception level (each Up/Down/Hold pattern) (each reception level change pattern stored in a reception level change storage unit 14) from each of the base stations 2-1 and 2-2 which is synchronous with the timing of the UL-TPC information (step S11 in FIG. 8).

If the respective Up/Down/Hold patterns stored in the UL-TPC pattern storage unit 13 and reception level change storage unit 14 coincide with each other (step S12 in FIG. 8), the mobile communication terminal 1 determines that each of the base stations 2-1 and 2-2 has properly received the UL-TPC information (step S13 in FIG. 8). If they do not coincide with each other (step S12 in FIG. 8), the mobile communication terminal 1 determines that each base station has not properly received the UL-TPC information (step S14 in FIG. 8).

The mobile communication terminal 1 compares all the Up/Down/Hold patterns stored in the UL-TPC pattern storage unit 13 and reception level change storage unit 14 (step S15 in FIG. 8). The mobile communication terminal 1 ignores the quality of reception data from a base station which is determined not to have properly received UL-TPC information (step S16 in FIG. 8), and performs downlink power control only in accordance with whether the quality of reception data from a base station determined to have properly received UL-TPC information satisfies the required quality defined for each service (steps S17 to S21 in FIG. 8).

In this case, if a plurality of base stations are determined to be normal (step S17 in FIG. 8), the mobile communication terminal 1 combines only reception data from these base stations (step S18 in FIG. 8), and checks whether the reception quality of the combined reception data from these base stations satisfies required reception quality (step S19 in FIG. 8). If the reception quality satisfies the required reception quality, the mobile communication terminal 1 transmits Down information thorough UL-TPC information (step S20 in FIG. 8). Otherwise, the mobile communication terminal 1 transmits Up information through UL-TPC information (step S21 in FIG. 8).

As has been described above, according to this embodiment, the mobile communication terminal 1 can reliably perform power control even during soft handover communication with a plurality of cells. That is, in this embodiment, downlink power control is properly performed with respect to a base station which has properly received UL-TPC information from the mobile communication terminal 1. This makes it possible to prevent an unstable state in which uplink communication depends on only one base station, and downlink communication depends on only the other base station, thereby preventing call disconnection.

What is claimed is:

1. A mobile communication system which controls downlink transmission power of a base station in accordance with a power control bit from a mobile communication terminal, wherein the mobile communication terminal includes determination means for determining whether downlink transmission power of the base station complies with the power control bit transmitted from the mobile communication terminal, based on a correspondence between (a) past power control bits that were transmitted by the mobile communication terminal and (b) changes in reception levels from the base station at respective times corresponding to the transmission of the past power control bits,
    wherein if a plurality of base stations are controlling downlink transmission power in accordance with power control bits, the mobile communication terminal combines only reception data from said plurality of base stations and then checks the reception quality, the mobile communications terminal controlling base station downlink transmission power based on said reception quality, and
    wherein said determination means includes pattern storage means for storing each Up/Down/Hold pattern in a past power control bit transmitted from the mobile communication terminal, reception level change storage means for storing a change in reception level from the base station which is synchronous with a timing of each of the power control bits, and comparison means for comparing a pattern in said pattern storage means with a change in reception level in said reception level change storage means, determines that the base station is controlling the downlink transmission power in accordance with the power control bit, when the pattern coincides with the change in reception level, and determines that the base station is not controlling the downlink transmission power in accordance with the power control bit, when the pattern does not coincide with the change in reception level.

2. The system according to claim 1, wherein during handover communication of the mobile communication terminal with a plurality of base stations, said determination means determines whether downlink transmission power of each of the base stations complies with the power control bit.

3. The system according to claim 1, wherein in control of downlink transmission power of the base station, quality of reception data from a base station which is determined not to be controlling the downlink transmission power in accordance with the power control bit is ignored.

4. The system according to claim 1, wherein downlink transmission power of the base station is controlled in accordance with whether or not quality of reception data from a base station which is determined to be controlling the downlink transmission power in accordance with the power control bit satisfies required reception quality.

5. The system according to claim 1, wherein when there are a plurality of base stations which are determined to be controlling the downlink transmission power in accordance with the power control bit, only reception data from said plurality of base stations are combined, and downlink transmission power of the base station is controlled in accordance with whether or not reception quality after combination satisfies the required reception quality.

6. A mobile communication terminal which controls downlink transmission power of a base station by transmitting a power control bit, comprising determination means for determining whether or not downlink transmission power of the base station complies with a power control bit transmitted from the mobile communication terminal, based on a correspondence between (a) past power control bits that were transmitted by the mobile communication terminal and (b) changes in reception levels from the base station at respective times corresponding to the transmission of the past power control bits,
wherein if a plurality of base stations are controlling downlink transmission power in accordance with power control bits, the mobile communication terminal combines only reception data from said plurality of base stations and then checks the reception quality, the mobile communications terminal controlling base station downlink transmission power based on said reception quality, and
wherein said determination means includes pattern storage means for storing each Up/Down/Hold pattern in a past power control bit transmitted from the mobile communication terminal, reception level change storage means for storing a change in reception level from the base station which is synchronous with a timing of each of the power control bits, and comparison means for comparing a pattern in said pattern storage means with a change in reception level in said reception level change storage means, determines that the base station is controlling the downlink transmission power in accordance with the power control bit, when the pattern coincides with the change in reception level, and determines that the base station is not controlling the downlink transmission power in accordance with the power control bit, when the pattern does not coincide with the change in reception level.

7. The terminal according to claim 6, wherein during handover communication of the mobile communication terminal with a plurality of base stations, said determination means determines whether downlink transmission power of each of the base stations complies with the power control bit.

8. The terminal according to claim 6, wherein in control of downlink transmission power of the base station, quality of reception data from a base station which is determined not to be controlling the downlink transmission power in accordance with the power control bit is ignored.

9. The terminal according to claim 6, wherein downlink transmission power of the base station is controlled in accordance with whether or not quality of reception data from a base station which is determined to be controlling the downlink transmission power in accordance with the power control bit satisfies required reception quality.

10. The terminal according to claim 6, wherein when there are a plurality of base stations which are determined to be controlling the downlink transmission power in accordance with the power control bit, only reception data from said plurality of base stations are combined, and downlink transmission power of the base station is controlled in accordance with whether or not reception quality after combination satisfies the required reception quality.

11. A power control method for a mobile communication system which controls downlink transmission power of a base station in accordance with a power control bit from a mobile communication terminal, comprising, on the mobile communication terminal side, the step of determining whether downlink transmission power of the base station complies with the power control bit transmitted from the mobile communication terminal, based on a correspondence between (a) past power control bits that were transmitted by the mobile communication terminal and (b) changes in reception levels from the base station at respective times corresponding to the transmission of the past power control bits,
wherein if a plurality of base stations are controlling downlink transmission power in accordance with power control bits, the mobile communication terminal combines only reception data from said plurality of base stations and then checks the reception quality, the mobile communications terminal controlling base station downlink transmission power based on said reception quality, and
wherein the step of determining whether the downlink transmission power complies with the power control bit includes the step of comparing a pattern in pattern storage means which stores each Up/Down/Hold pattern in a past power control bit transmitted from the mobile communication terminal with a change in reception level in reception level change storage means for storing a change in reception level from the base station which is synchronous with a timing of each of the power control bits, and includes determining that the base station is controlling the downlink transmission power in accordance with the power control bit, when the pattern coincides with the change in reception level, and determining that the base station is not controlling the downlink transmission power in accordance with the power control bit, when the pattern does not coincide with the change in reception level.

12. The method according to claim 11, wherein the step of determining whether the downlink transmission power complies with the power control bit, includes, during handover communication of the mobile communication terminal with a plurality of base stations, determining whether downlink transmission power of each of the base stations complies with the power control bit.

13. The method according to claim 11, wherein in control of downlink transmission power of the base station, quality of reception data from a base station which is determined not to be controlling the downlink transmission power in accordance with the power control bit is ignored.

14. The method according to claim 11, wherein downlink transmission power of the base station is controlled in accordance with whether or not quality of reception data from a base station which is determined to be controlling the downlink transmission power in accordance with the power control bit satisfies required reception quality.

15. The method according to claim 11, wherein when there are a plurality of base stations which are determined to be controlling the downlink transmission power in accordance with the power control bit, only reception data from the plurality of base stations are combined, and downlink transmission power of the base station is controlled in accordance with whether or not reception quality after combination satisfies the required reception quality.

16. A computer-readable storage medium storing a computer-executable program for causing a program-controlled computer to execute a power control method for a mobile communication system which controls downlink transmission power of a base station in accordance with a power control bit from a mobile communication terminal, the program causing a computer to execute a process of determining whether downlink transmission power of the base station complies with the power control bit transmitted from the mobile communication terminal, based on a correspondence between (a) past power control bits that were transmitted by the mobile communication terminal and (b) changes in reception levels from the base station at respective times corresponding to the transmission of the past power control bits, wherein if a plurality of base stations are controlling downlink transmission power in accordance with power control bits, the mobile communication terminal combines only reception data from said plurality of base stations and then checks the reception quality, the mobile communications terminal controlling base station downlink transmission power based on said reception quality, and wherein the process of determining whether the downlink transmission power complies with the power control bit includes the process of comparing a pattern in pattern storage means which stores each Up/Down/Hold pattern in a past power control bit transmitted from the mobile communication terminal with a change in reception level in reception level change storage means for storing a change in reception level from the base station which is synchronous with a timing of each of the power control bits, and includes determining that the base station is controlling the downlink transmission power in accordance with the power control bit, when the pattern coincides with the change in reception level, and determining that the base station is not controlling the downlink transmission power in accordance with the power control bit, when the pattern does not coincide with the change in reception level.

\* \* \* \* \*

UNITED STATES PATENT AND TRADEMARK OFFICE
CERTIFICATE OF CORRECTION

| | | |
|---|---|---|
| PATENT NO. | : 7,634,288 B2 | Page 1 of 1 |
| APPLICATION NO. | : 10/901181 | |
| DATED | : December 15, 2009 | |
| INVENTOR(S) | : Hokao | |

It is certified that error appears in the above-identified patent and that said Letters Patent is hereby corrected as shown below:

\*\* On the Title Page, Item [12] and Item [75] Inventor, please correct the last name of the inventor from "Tomoaki Hakao to -- Tomoaki Hokao --\*\*

Signed and Sealed this

Sixteenth Day of February, 2010

David J. Kappos
*Director of the United States Patent and Trademark Office*